United States Patent [19]
Kishi et al.

[11] Patent Number: 5,635,665
[45] Date of Patent: Jun. 3, 1997

[54] LINEAR GAS GENERANT AND FILTER STRUCTURE FOR GAS GENERATOR

[75] Inventors: Kazuo Kishi, Kanagawa; Jun Kato, Tokyo, both of Japan

[73] Assignee: Daicel Chemical Industries, Ltd., Japan

[21] Appl. No.: 385,963

[22] Filed: Feb. 9, 1995

Related U.S. Application Data

[62] Division of Ser. No. 122,536, Sep. 27, 1993, Pat. No. 5,503,079.

[51] Int. Cl.$^6$ .............................. C06D 5/06; B01D 24/00
[52] U.S. Cl. .............................. 102/288; 102/530; 55/527
[58] Field of Search ..................... 55/524, 527; 102/288, 102/530; 280/741

[56] References Cited

U.S. PATENT DOCUMENTS

| | | | |
|---|---|---|---|
| 3,574,800 | 4/1971 | Pierce | 264/33 |
| 4,072,546 | 2/1978 | Winer | 149/19.8 |
| 4,181,514 | 1/1980 | Lefkowitz et al. | 55/524 X |
| 4,296,084 | 10/1981 | Adams et al. | 423/351 |
| 4,660,475 | 4/1987 | Rogowski et al. | 102/284 |
| 5,204,068 | 4/1993 | O'Loughlin et al. | 55/527 X |
| 5,464,249 | 11/1995 | Lauritzen et al. | 280/741 |
| 5,492,364 | 2/1996 | Anderson et al. | 280/741 |

FOREIGN PATENT DOCUMENTS

| | | |
|---|---|---|
| 1189854 | 10/1959 | France . |
| 1349125 | 4/1964 | France . |
| 2843477 | 4/1980 | Germany . |
| 25817159 | 4/1983 | Japan . |
| 3219020 | 4/1990 | Japan . |
| 4-2541 | 1/1992 | Japan . |
| 964801 | 7/1964 | United Kingdom . |
| 1156994 | 7/1969 | United Kingdom . |
| 1490511 | 11/1977 | United Kingdom . |

OTHER PUBLICATIONS

Foreign Search Report of PCT/JP93/00137.
English Language EPO Search Report May 2, 1995.

*Primary Examiner*—Peter A. Nelson
*Attorney, Agent, or Firm*—Weingram & Associates, P.C.

[57] ABSTRACT

A linear gas generant to be used in, for example, a gas generator for rapidly launching a flier such as a rocket or for rapidly inflating an air bag in a motor vehicle characterized by disposing a fibrous substance, such as copper, silver, aluminum or carbon, along the axial direction thereof. This linear gas generant can be stably deflagrated under a lower ambient pressure, irrespective of a large specific burning area.

Disclosed further is a filter structure for a gas generator to be used in an air bag restraint system, which is produced by winding a continuous high-tensile-strength fiber bundle or yarn at a predetermined pitch around an outer surface of a member (a gas generation member) comprising ignition means and gas generation means actuated by the ignition means. This filter structure attains the reduction in weight of the gas generator.

17 Claims, 2 Drawing Sheets

LINEAR GAS GENERANT AND FILTER STRUCTURE FOR GAS GENERATOR

This is a divisional of application Ser. No. 08/122,563 filed on Sep. 27, 1993, and now U.S. Pat. No. 5,503,079.

FIELD OF THE INVENTION

The present invention relates to a linear gas generant to be used in a gas generator for rapidly launching a flier such as a rocket or for rapidly inflating an air bag in a motor vehicle.

Further, the present invention relates to a gas generator to be used in an air bag restraint system, particularly a filter structure thereof.

Both the present inventions contribute toward the weight reduction of the gas generator.

DESCRIPTION OF THE RELATED ART

Figure 1:
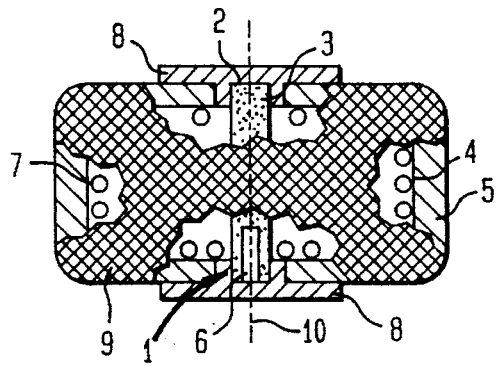
FIG. 1 is a sectional view of a gas generator of an air bag for a driver, which is provided with a filter structure according to the present invention.

With respect to gas generants to be used in a gas generator for launching a rocket or for rapidly inflating an air bag in a motor vehicle, the amount of deflagration of the agent per unit time must be markedly large as compared with that of the conventional solid rocket propellant or oxygen gas generant for respiration. Accordingly, a method for increasing the burning rate of the gas generant per se, a method for increasing an ambient pressure and a method for increasing a burning area per unit weight (hereinafter referred to as "specific burning area") are generally employed independently or in combination.

Among these methods, the method for increasing the burning rate of the gas generant per se attains such an increase in the burning rate, for example, by the addition of a combustion catalyst, but the range wherein the burning rate increase can be controlled is limited. The method for increasing an ambient pressure has a drawback in that the weight of a combustor is gravely increased, despite the contemporary requirement for the weight reduction of the same. Therefore, generally, the method for increasing the specific burning area is employed to increase the amount of deflagration.

As a particular means for increasing the specific burning area, division or granulation of the gas generant is generally employed. However, when such a divided or granulated gas generant is used by charging it into a rocket motor or a gas generator, it is difficult to fix individual particles of the gas generant granulated at appropriately predetermined positions. Further, these particles are apt to be entrained by a gas stream produced by deflagration to be discharged outside the motor or gas generator before the completion of deflagration or to be explosively deflagrated. Hence, the employment of a divided or granulated gas generant generally causes unstable deflagration. For coping with the unstable deflagration, the maximum amount of gas generant usable at one time in a gas generator for launching a rocket or for use in an air bag is principally governed by the limit of charge which is determined in accordance with the type of the gas generator and is naturally small, although this depends on the characteristics of the gas generant, such as raw material formulation and configuration. Thus, it has been difficult to manufacture a gas generator charged with a gas generant in an amount freely exceeding the limit.

Therefore, for example, a particulate gas generant having an especially large specific burning area is charged in a very small amount and used only in an ignition device or the like. It has been difficult to charge a necessary and satisfactory amount of such a gas generant into a gas generator for launching a rocket or for an air bag and to use it. Consequently, in a gas generator for launching a rocket or for an aft bag, a gas generant having a relatively small specific burning area has been deflagrate under a high ambient pressure. Due to the deflagration under a high ambient pressure, the conventional gas generator must inevitably have a structure resisting a high combustion pressure, so that the weight thereof is large. With respect to the gas generator with large weight, not only the manufacturing cost thereof is highly unfavorably, but also there is a latent possibility that rocket operators or vehicle occupants suffer from grave disaster by a breakdown occurring in the gas generator, which is caused by an abnormally high combustion pressure attributed to defective materials of the gas generant or by lowering of the pressure resistance attributed to defective materials of the gas generator.

The present invention has been made under these circumstances and an object of the present invention is to provide a gas generant having a structure such that stable deflagration under a lower ambient pressure is ensured irrespective of a large specific burning area, namely, a linear gas generant.

The state of the art regarding the gas generator for an air bag is as follows.

The air bag restraint system comprises a gas generator and a cushioning air bag, and is mounted on a motor vehicle or the like. The air bag restraint system has such a function that a gas is generated from the gas generator upon collision and introduced into the air bag, thereby inflating and displaying the same to protect the occupants from the shock of collision.

The gas generator generates a gas by igniting, with ignition means, and deflagrating a gas generant (for example, a mixture of sodium azide and sulfur) as gas generation means. In the air bag restraint system, the generated gas, which contains solid or condensable by-products, is led through a filter into the air bag, thereby inflating and displaying the air bag.

Figure 6:
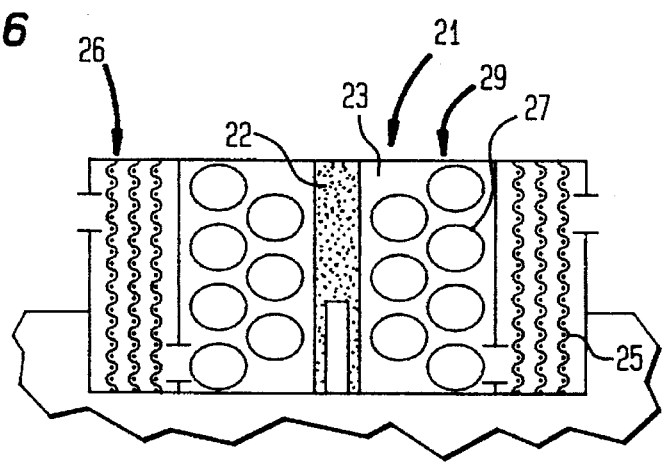
FIG. 6 is a sectional view of the structure of the conventional gas generator.

FIG. 6 shows the structure of the conventional, generally employed gas generator for an air bag. The gas generator 21 has an outer shell container 29, in the center of which ignition means 22 is disposed. Provided around the ignition means 22 is a combustion chamber 23 accommodating a gas generant 27. A filtration chamber 26 accommodating a filter 25 is disposed outside the combustion chamber 23. The outer shell container 29 is made of a metal and has a pressure structure so that it can withstand a combustion pressure as high as 100 to 200 atm produced in the combustion chamber 23.

The filter 25 disposed in the filtration chamber 26 generally has a laminate structure composed of a metal net and a heat-resistant cloth. Specifically, the widely employed filter comprises a laminate of a metal net selected from among those of various types which may have different wire diameters and a felt or cloth formed of fibers of glass, ceramic or the like. The outer shell container and the filter account for a major portion of the weight of the gas generator.

In recent years, the emission control of carbon dioxide has strongly been called for from the viewpoint of environmental pollution prevention. In accordance with this tendency, the weight reduction of a motor vehicle and, in turn, that of a gas generator have suffered as a problem to be solved. Therefore, there is a technical task directed to reducing the weights of the metallic outer shell container with a pressure structure and the filter with a laminate structure, which account for a major portion of the weight of the gas generator.

Conventionally, the filter is often molded into a ring or cylindrical form and usable filters include a laminate of several types of stainless steel nets, a metallic foam, a metallic baffle plate and the like. However, not only is the manufacturing of a ring or cylindrical form filter by laminating the above-mentioned metal nets time-consuming, but also there are problems that the molded article thereof is apt to have loose edges, and therefore the assembling of the gas generator is difficult because the loose edges obstruct the assembling or gas leakage is caused at the portions of the loose edges.

A compression-molded filter with a porous, three-dimensional net structure is disclosed in Japanese Patent publication-A No. 2541/1992, which is, however, not satisfactory from the viewpoint of attainment of the desired weight reduction.

Thus, it is another object of the present invention to obtain, at low cost, a filter structure which combines the functions of a filter and a pressure container, which is lightweight and has pressure and thermal resistances, and which is excellent in the efficiency of trapping hazardous components.

It is a further object of the present invention to provide a gas generator provided with the above filter structure.

Disclosure of the Invention

The present inventors have made extensive studies to accomplish the above problems. As a result, they have found that a flexible linear gas generant having a fibrous substance disposed therein along the axial direction thereof has a large specific burning area, and that when such a linear gas generant is fixed in a gas generator, for example, by winding around an appropriate portion thereof and is deflagrate, stable deflagration can be achieved even under a lower ambient pressure. The present invention has been completed on the basis of these findings.

Thus, the present invention provides a linear gas generant in which a fibrous substance having a length larger than its diameter is disposed along the axial direction thereof.

The linear gas generant of the present invention is characterized by comprising a gas generant (a) and a fibrous substance (b) having a length larger than a diameter thereof, said fibrous substance (b) being disposed so as to cause its longitudinal direction to coincide with the axial direction of the linear gas generant.

The linear gas generant of the present invention can be produced by either disposing a gas generant (a) on the surface of a long fibrous substance (b), or disposing a long fibrous substance (b) in a slim linear gas generant (a) along the axial direction thereof.

Accordingly, in the linear gas generant of the present invention, the distribution of the fibrous substance (b) is not particularly limited in a section perpendicular to the axial direction of the linear gas generant.

Moreover, the present invention provides a filter structure for a gas generator characterized in that, by winding, at a predetermined pitch, a continuous high-tensile-strength fiber bundle or yarn on a member (gas generation member) comprising ignition means and gas generation means actuated by the ignition means, a laminate with filtration capability and pressure resistance is formed on the outer surface of the member.

That is, the filter structure for a gas generator of the present invention is those comprising a laminate with filtration capability and pressure resistance which is formed on an outer surface of a gas generation member comprising ignition means and gas generation means actuated by the ignition means, and is characterized that said laminate is one produced by winding a continuous high-tensile-strength fiber bundle or yarn around said outer surface of the gas generation member at a predetermined pitch.

Furthermore, the present invention provides a gas generator comprising a gas generation member, said member comprising ignition means and gas generation means actuated by the ignition means, and a laminate (filter structure) with filtration capability and pressure resistance, wherein the laminate is formed by winding a continuous high-tensile-strength fiber bundle or yarn around the outer surface of the gas generation member at a predetermined pitch.

Said the high-tensile-strength fiber is preferably one selected from among glass fiber, ceramic fiber, carbon fiber, aramid fiber, polyethylene fiber and steel fiber, or a combination of these fibers.

The present invention will now be described in greater detail.

As the gas generant (a) for use in the linear gas generant of the present invention, a two-component propellant comprising cellulose nitrate and nitroglycerin; a multicomponent propellant comprising such a two-component propellant and, added thereto, a nitramine or the like; a composite type propellant composed of ammonium perchlorate and an organic fuel binder comprising polybutadiene or the like, optionally further containing a combustion catalyst, aluminum powder or the like; a nitrogen generant composed of an, azide, niter, a metal oxide and an inorganic binder comprising sodium silicate or the like; and an oxygen generant comprising potassium perchlorate, carbon and sodium silicate can be used. Further, a gaseous carbon dioxide generant comprising potassium perchlorate, cellulose acetate and the like, optionally further containing a powdery metal, in particular, a gaseous carbon dioxide generant comprising sodium perchlorate and cellulose triacetate and a gaseous carbon dioxide generant comprising potassium perchlorate, cellulose acetate and iron oxide; a self-burning gas generant; an oxygen generant comprising potassium perchlorate and sodium silicate; a gaseous carbon dioxide generant comprising a carbonate of an alkaline earth metal and sodium silicate; and an endothermic gas generant can be used.

The material of the long fibrous substance (b) used in the present invention is selected from among a metal selected from among single metals, such as aluminum, magnesium, iron, nickel, titanium, copper, silver and gold, and alloys thereof; an inorganic substance selected from among carbon, graphite, glass, silica, alumina, ceramics and the like; and an organic substance selected from among polyesters, polyimides, polycarbonates, polyolefins, polyethers, polystyrene, cellulose acetate, cellulose, vinyl acetate, nylons, polyurethanes and the like. The long fibrous substance (b) comprises a single fiber or a bundle of a plurality of finer single fibers. Each of the single fibers may be either linear or warily crimped. The diameter of each of the single fibers is preferably from 0.1 μm to 1 mm. The sectional configuration of each single fiber is not particularly limited, and may be, for example, circular, triangular, square, rectangular or semicircular. However, it is preferred that the sectional configuration of the single fiber be not circular from the viewpoint of attaining excellent adhesive property to the gas generant (a) or effective trapping of residues resulting from the deflagration of the gas generant (a).

The combustibility of the gas generant (a) is markedly affected by the material of the fiber. Therefore, a material having high thermal conductivity, such as copper, silver, aluminum or carbon, is preferably selected for ensuring, in particular, excellent combustibility.

To produce the linear gas generant of the present invention, a process which comprises first coating a fibrous substance (b) as mentioned above with a gas generant (a) or a solution thereof, the viscosity of which has been adjusted to an appropriate value in advance by heating or by the addition of a volatile solvent, in a desired thickness by a dip coating method, a spraying method, an injection method or other suitable coating method, and subsequently conducting a treatment such as drying by heating or thermal polymerization to cure, may be conducted.

The sectional configuration of the linear gas generant of the present invention may be arbitrary selected among circular, square, rectangular, etc. depending on the object of the use and the place in which the linear gas generant is incorporated. The sectional configuration of the linear gas generant of the present invention may be arranged by molding it with the use of a die or the like in such a step during the drying or curing of the gas generant (a) that the materials therefor have plasticity. The distribution of the fibrous substance (b) is not particularly limited over a section perpendicular to the axial direction of the linear gas generant.

The filter structure of the present invention has the functions of both a pressure container and a filter. That is, the filter structure is one which is produced by winding a continuous high-tensile-strength fiber on the gas generation member at a predetermined pitch, wherein a laminate having gas permeability is disposed on an outer surface of a gas generation member. This laminate constitutes the wall of the gas generator, and simultaneously functions as a filter by virtue of its gas permeability.

Aluminum alloy and stainless steel, which are generally employed as a material constituting an outer shell of a gas generator at present, respectively have a tensile strength of about 20 kg/mm$^2$ with a specific gravity of about 2.7 g/cm$^3$ and a tensile strength of about 40 kg/mm$^2$ with a specific gravity of about 8.0 g/cm$^3$. On the other hand, glass fiber as an example of the high-tension inorganic fiber and piano wire respectively have a tensile strength of about 350 kg/mm$^2$ with a specific gravity of about 2.5 g/cm$^3$ and a tensile strength of about 250 kg/mm$^2$ with a specific gravity of about 7.8 g/cm$^3$. The tensile strength values are incomparably larger than those of the conventional shell materials. Therefore, by making the best use of this characteristic of the high-tensile-strength fiber, a gas generator having excellent pressure resistance can be obtained. The filter structure of the present invention has the function of a pressure container, so that there is no necessity for installing an extra pressure container separately from the filter, whereby the weight of the gas generator can be reduced that much.

The filter of the gas generator should have the following functions.

(a) First, the filter should have a trapping function. A gas produced by the deflagration of the gas generant is first introduced into the air bag and then rapidly discharged into the compartment of the vehicle through a vent hole made in advance in the air bag in order to increase a shock absorbing effect. Therefore, the filter should have the function of trapping hazardous components while allowing safe gas to freely pass so that the hazardous components are prevented from being introduced into the air bag and the compartment of the vehicle.

(b) Secondly, the filter should have a cooling function. When a high-temperature gas produced by the deflagration is introduced as it is into the air bag, there is the danger that the air bag is burned. To avoid this danger, the filter should have the function of cooling the combustion gas to an appropriate temperature.

A desirable filter structure having both of the above functions is realized by taking into consideration the temperature of the gas discharged from the gas generation member, the chemical composition of the gas, the physical change occurring between the by-product entrained by the gas and the fiber and their chemical reactivities in the selection of the high-tensile-strength fiber to be used in the present invention.

For example, a glass fiber or a ceramic fiber is suitable when a high-temperature oxidizing gas containing free oxygen, carbon dioxide and the like is discharged from the gas generation member. Alternatively, a carbon fiber or a steel fiber is suitable when a high-temperature inert gas is discharged. Further, when a gas having a relatively low temperature is discharged, use may be made of an organic fiber, such as an aramid fiber.

When the by-product of the deflagration of the gas generant comprises oxides and salts of alkali metals or alkaline earth metals, a glass fiber or a ceramic fiber is preferably employed, because the by-product can be chemically trapped in the form of a silicate or the like, thus being advantageous from the viewpoint of filtration efficiency.

As a container accommodating ignition means and gas generation means which constitutes a gas generation member, generally, use is made of a container, that is, a core-type member, having gas permeability, and an example thereof includes one made of a metal net. The high-tensile-strength fiber wound on the container is in the form of a bundle or yarn comprising fibers of the same type or a combination of fibers of different types. The winding density, i.e., the interval between adjacent fibers and the thickness of the laminate, depends on the temperature, pressure and flow time of generated gas and the properties and contents of the by-products, so that it is not constant. With respect to the interstice provided between fibers, piling of fibers one upon another in the direction of the flow of the generated gas is avoided and a three-dimensionally uniform distribution of the interstices is effected in order to ensure high filtration efficiency.

In producing the filter structure of the present invention, mutual fixing of high-tensile-strength fibers with an adhesive or the like is not particularly required. However, at filter edges, fixing with, for example, a resin is preferred. Various methods for winding the fiber bundle or yarn, such as helical wind, parallel wind (hoop wind) and level wind (in-plane wind), are known. In the present invention, it is preferred that a combination of various winding methods be adopted from the viewpoint of gas permeability and pressure resistance. For example, it is advantageous from the viewpoint of pressure resistance that a yarn comprising a plurality of filaments each having a diameter of about 30 μm or below are wound at an angle of about 45° to the axis of the gas generation member.

The gas generator of the present invention comprises a gas generation member and a filter structure according to the present invention, said gas generation member comprising ignition means and gas generation means actuated by the ignition means. The ignition means and the gas generation means are not critical, and may be those generally employed in the art.

According to the present invention, a linear gas generant, which is stably combustible under a lower ambient pressure, irrespective of a large specific burning area, is provided.

When the linear gas generant of the present invention is employed, it is not necessary for a gas Eenerator to have a structure resistant to a high combustion pressure, so that the weight of the gas generator can be reduced and so is the manufacturing cost thereof.

Moreover, the gas generator comprising the linear gas generant of the present invention is free from the potential problem of the conventional gas generator, that is, the problem that there are possibilities that rocket operators or vehicle occupants suffer from grave disaster by a breakdown occurring in the gas generator, which is caused by an abnormally high combustion pressure attributed to defective materials of the gas generant or by a lowering of the pressure resistance attributed to defective materials of the gas generating portion thereof.

By virtue of the present invention, both reduction in weight and simplification of the gas generator are attained simultaneously. More specifically, the filter structure of the gas generator according to the present invention comprises a laminate formed on an outer surface of a gas generation member, and has the functions of both a pressure container and a filter. Therefore, according to the present invention, an extra pressure container installed separately from the filter in the prior art is not necessitated, and reduction in that weight and simplification in structure are attained.

The filter structure of the present invention is obtained by mechanically winding a fiber bundle or yarn, so that the process therefor is simple and easy as compared with that of the prior art.

Furthermore, in the production of the filter structure according to the present invention, the formation of a pressure container is performed concurrently with that of a filter. Consequently, the step of preparing a container can be omitted, and also any welding step is rendered unnecessary, to thereby contribute toward cost reduction.

EXAMPLES

Now, the present invention will be described in greater detail with reference to the following Examples. However, the present invention is not limited to specific embodiments shown and illustrated below, and various partial modifications can be effected thereto as long as they are within the spirit and scope of the invention as set out in the accompanying claims. In the Examples, parts mean parts by weight.

Example 1

At a pressure reduced to 0.01 atm, 50 parts of ammonium perchlorate having an average particle size of 200 μm, 30 parts of ammonium perchlorate having an average particle size of 15 μm and 20 parts of a fuel binder comprising a stoichiometric mixture of hydroxylated polybutadiene and isophorone diisocyanate were mixed together to obtain a viscous slurry. This slurry and a bundle of three copper wires each having a diameter of 0.1 mm were simultaneously extruded through a nozzle, followed by polymerizing and curing at 80° C. Thus, a flexible linear gas generant having an outer diameter of 2 mm was obtained.

Example 2

73 parts of sodium perchlorate having an average particle size of 18 μm, 27 parts of cellulose triacetate, 90 parts of methylene chloride and 10 parts of methanol were mixed together to obtain a viscous slurry. This slurry and a bundle of three copper wires each having a diameter of 0.1 mm were simultaneously extruded through a nozzle, followed by drying and solidifying at 20° C. Thus, a linear gas generant having an outer diameter of 2 mm was obtained.

Example 3

A slurry, which is obtained by mixing 70 parts of nitrocellulose, 30 parts of nitroglycerin and 100 parts of acetone together, and a bundle of three copper wires each having a diameter of 0.1 mm were extruded and dried in the same manner as that of Example 2. Thus, a linear gas generant having an outer diameter of 2 mm was obtained.

Example 4

Below, one embodiment of the present invention will be described by referring to the drawings.

FIG. 1 is a sectional view of a gas generator of an air bag for a driver.

This gas generator includes a container 4 composed of a metal net, ignition means 1 disposed in the container 4, and a gas generant 7 ignited by the ignition means 1. The ignition means 1 comprises an ignition tube 2 packed with an ignition material 3 (mixture of boron and niter) and a squib 6 disposed in the ignition tube 2 in contact with the ignition material 3. The ignition means 1 is held by an adaptor 8 and fixed at the center of the container 4. The surroundings of the ignition means 1 are packed with the gas generant 7. The gas generant 7 is cylindrical and has a diameter of about 2 mm. It is a composition comprising cellulose acetate, triacetin, potassium perchlorate and iron oxide. 90 g of the gas generant 7 is used.

Figure 2:
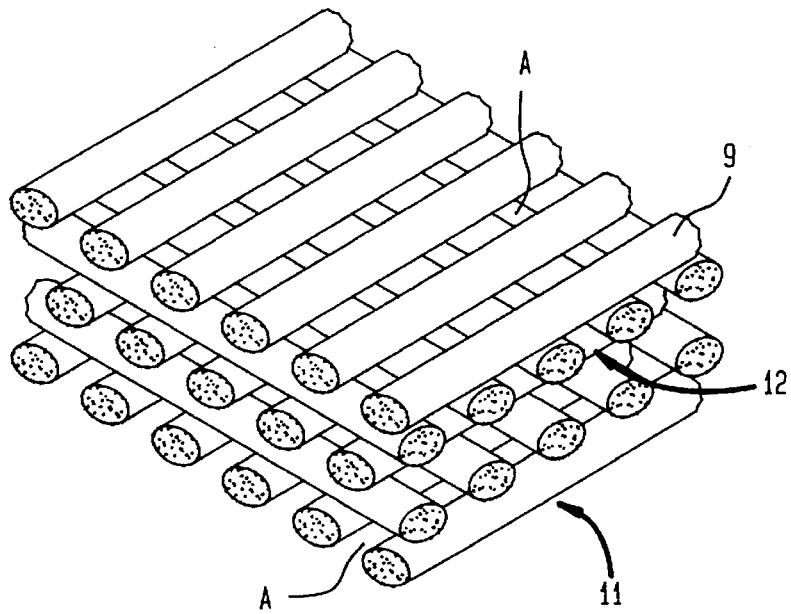
FIG. 2 is a perspective view showing how a fiber bundle or yarn is wound in the filter structure of the present invention.

Formed on an outer surface of the container 4 is a laminate gas permeable, i.e., a filter 5. The filter 5 is produced by winding a continuous high-tensile-strength fiber yarn around the outer surface of the container 4 at a predetermined pitch to form a multilayer laminate so that the yarn portions of adjacent layers cross each other. In particular, a yarn 9 of glass fibers (ECDE75•½ 3.8 S produced by Nitto Boseki Co., Ltd.) is wound to be the width of the space A between the yarn portions (see FIG. 2) of 0.5 mm and at an angle of about 45° to the axis 10 of the ignition tube to complete a wind, followed by subsequent winding of the yarn on the completed wind so that the yarn portions of adjacent layers cross each other at about right angles. A third layer 12 is piled above a first layer 11 so that the yarn portions of the third layer 12 are each positioned just above the space A of the first layer 11. Thus, a laminate 5 having a thickness of 15 mm is produced on the outer surface of the container 4. The laminate 5 not only forms the wall of the container but also functions as a filter by virtue of its gas permeability. The laminate 5 thus formed has a high pressure resistance because of the high-tension property of the yarn.

In the inflation and display of the air bag, a gas is generated and introduced into the bag in the following manner. That is, as soon as a sensor (not shown) senses a shock, an ignition signal is fed to the squib 6 to actuate the same. Thus, the ignition material 3 is ignited to produce a high-temperature flame. This flame is injected through a nozzle of the ignition tube 2 to ignite the gas generant 7. Thus, the gas generant 7 is burnt to produce a combustion gas at high temperature and pressure. The combustion gas is introduced through the container 4 gas permeable into the filter 5. While being passed through the filter 5, the combustion gas is cooled and filtered. The resultant combustion gas thus obtained by being cooled and filtered flows into the air bag (not shown). As a result, the air bag is instantaneously inflated to protect the occupants from the shock. The filter 5 not only performs cooling of the high-temperature combustion gas but also traps any by-product.

Figure 3:
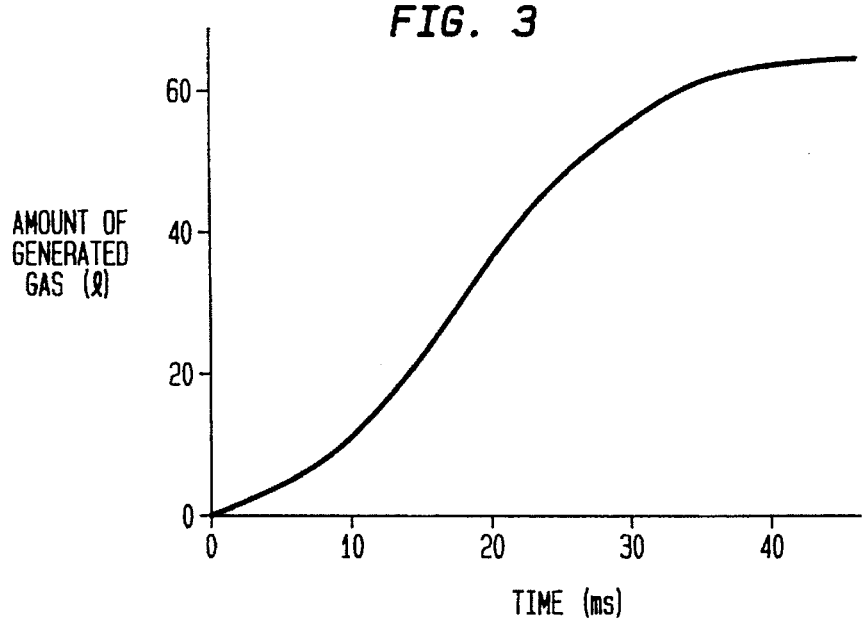
FIG. 3 is a graph showing the result of a gas generation test made with the gas generator shown in FIG. 1.

FIG. 3 shows the result of a gas generation test of the gas generator provided with the filter structure of the present invention in a tank having a capacity of 60-1. The burn time was 35 ms, and the amount of the by-product discharged into the tank was 80 mg. This figure indicates that the filter structure of the present invention ensures appropriate burning of the gas generant.

Figure 4:
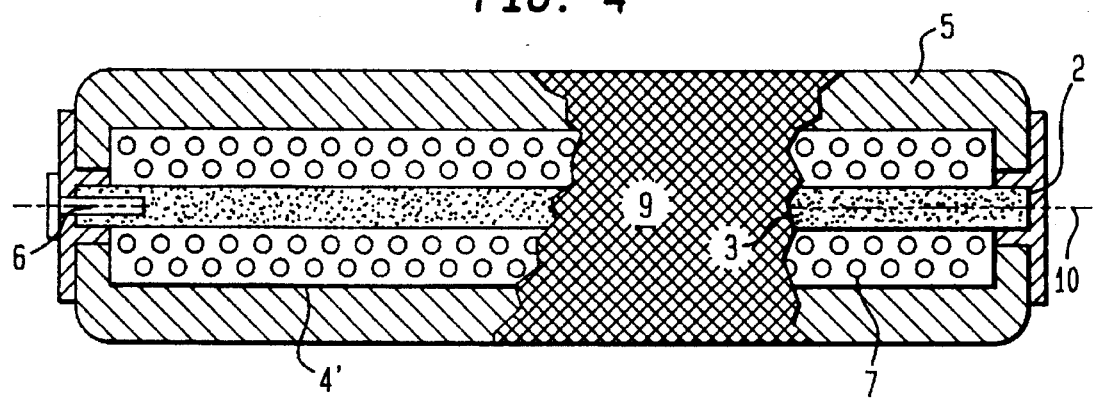
FIG. 4 is a sectional view of a gas generator of an air bag for a passenger, which is provided with a filter structure according to the present invention.

FIG. 4 is a sectional view of a gas generator of an air bag for a passenger. In order to avoid overlapping, like elements are designated by like marks, and descriptions are not repeated. In this gas generator, a container 4' is also composed of a metal net, and is cylindrical with its both ends closed. 270 g of the gas generant 7 is used.

Around an outer surface of this container 4', a glass fiber yarn 9 is wound in the same manner as that described above to form a multilayer.

Figure 5:
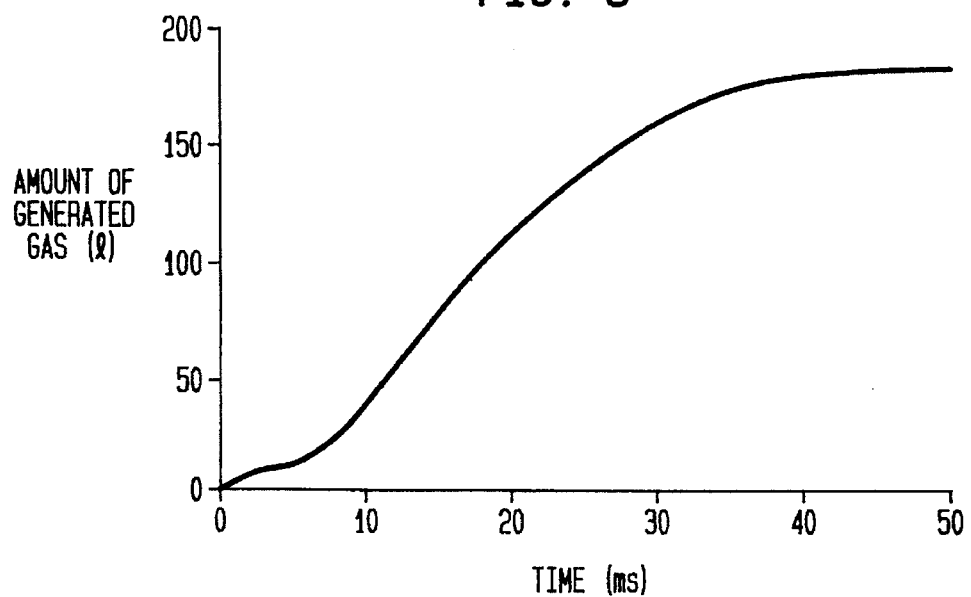
FIG. 5 is a graph showing the result of a gas generation test made with the gas generator shown in FIG. 4.

FIG. 5 shows the result of a gas generation test of the gas generator provided with the present filter structure in a tank having a capacity of 60-1 as employed above. The burn time was 35 ms, and the amount of the by-product discharged into the tank was 250 mg.

We claim:

1. A filter structure for a gas generator having ignition means and gas generation means activated by the ignition means, the filter structure comprising:

a container for the gas generating means;

a winding at a predetermined pitch of a continuous high tensile strength fiber, the winding wrapped on an outermost surface of the container for forming a laminate to filter gas produced by the gas generator and provide pressure resistance at the outermost surface of the container.

2. The filter structure according to claim 1, wherein the continuous fiber is a filter selected from the group consisting of a glass fiber, ceramic fiber, carbon fiber, aramid fiber, polyethylene fiber, steel fiber, and a combination thereof.

3. A filter structure for a gas generator having ignition means and gas generation means actuated by the ignition means, the filter structure comprising:

a housing having an outer surface, the outer surface of the housing forming the outer surface of the gas generator;

a continuous high tensile strength fiber wrapped on the outer surface of the housing at a predetermined pitch for forming a gas permeable laminate, the gas permeable laminate arranged to filter gas produced by the gas generator and provide pressure resistance at the outer surface of the housing.

4. A gas generator for an air bag comprising:

a gas generation member comprising:

a housing having an outer surface, the outer surface of the housing forming the outer surface of the gas generation member;

ignition means;

gas generation means actuated by the ignition means; and a continuous high tensile strength fiber wrapped on the outer surface of the housing at a predetermined pitch for forming a gas permeable laminate, the gas permeable laminate arranged to filter gas produced by the gas generator and provide pressure resistance at the outer surface of the housing.

5. A gas generator for an air bag comprising:

a central column containing ignition means;

a container disposed about the central column for holding gas generating means;

a housing surrounding the container for holding the gas generating means, the housing comprising:

a winding of a continuous high tensile strength fiber forming an outermost surface of the housing, the winding comprised of multiple layers to form a laminate, the separate strands of the winding coacting to filter gas produced by the gas generating means and provide pressure resistance from gas from generated by the gas generating means.

6. A gas generator according to claim 5, wherein the winding is arranged at a predetermined pitch at the outermost surface of the housing.

7. A gas generator according to claim 5, wherein the winding of the laminate is arranged on the outermost surface of the housing in a cylindrical shape.

8. The gas generator according to claim 5, further comprising:

a pair of adaptor members spaced apart at opposed sides of the container for holding the central column and the ignition means in position in the container.

9. The gas generator according to claim 5, wherein the continuous fiber is a fiber selected from the group consisting of a glass fiber, ceramic fiber, carbon fiber, aramid fiber, polyethylene fiber, steel fiber, and a combination thereof.

10. The gas generator according to claim 5, wherein the separate strands of the winding forming the laminate cross each other at approximately right angles.

11. The gas generator according to claim 5, wherein the continuous high tensile strength fiber comprises:

a plurality of strands constructed and arranged as a high tensile strength yarn.

12. A filter structure for a gas generation member of a gas generator, the filter structure comprising:

a continuous fiber wound about an outer surface of the gas generation member, the continuous fiber constructed and arranged to form a laminate at the outer surface to filter gas produced by the gas generator and provide pressure resistance for the gas generator.

13. The filter structure according to claim 12, wherein the continuous fiber is a fiber selected from the group consisting of a glass fiber, ceramic fiber, carbon fiber, aramid fiber, polyethylene fiber, steel fiber, and a combination thereof.

14. The filter structure according to claim 12, wherein the continuous fiber is at a predetermined pitch to encircle the outer surface of the gas generation member.

15. The filter structure according to claim 12, wherein the continuous fiber is constructed as a yarn of high tensile strength material.

16. The filter structure according to claim 12, wherein the continuous fiber is constructed and arranged to form the laminate as a plurality of layers, wherein portions of the plurality of the layers adjacent each other cross each other.

17. The filter structure according to claim 16, wherein the portions of the continuous fiber of the adjacent layers cross each other at approximately right angles.

* * * * *